US008462970B2

(12) United States Patent
Mouhssine et al.

(10) Patent No.: US 8,462,970 B2
(45) Date of Patent: Jun. 11, 2013

(54) AUDIO ENCODING AND DECODING METHOD AND ASSOCIATED AUDIO ENCODER, AUDIO DECODER AND COMPUTER PROGRAMS

(75) Inventors: Adil Mouhssine, Rennes (FR); Abdellatif Benjelloun Touimi, London (GB)

(73) Assignee: France Telecom, Paris (FR)

( * ) Notice: Subject to any disclaimer, the term of this patent is extended or adjusted under 35 U.S.C. 154(b) by 699 days.

(21) Appl. No.: 12/599,519

(22) PCT Filed: Apr. 16, 2008

(86) PCT No.: PCT/FR2008/050672

§ 371 (c)(1), (2), (4) Date: Apr. 7, 2010

(87) PCT Pub. No.: WO2008/145894

PCT Pub. Date: Dec. 4, 2008

(65) Prior Publication Data

US 2010/0198601 A1 Aug. 5, 2010

(30) Foreign Application Priority Data

May 10, 2007 (FR) ..................................... 07 03347

(51) Int. Cl.
*H04R 25/00* (2006.01)
*H04B 15/00* (2006.01)

(52) U.S. Cl.
USPC .......................................... 381/320; 381/94.2

(58) Field of Classification Search
USPC .................... 704/500, 201; 381/27, 300, 310, 381/17, 1, 320, 94.2; 700/94
See application file for complete search history.

(56) References Cited

U.S. PATENT DOCUMENTS

| | | | | |
|---|---|---|---|---|
| 8,379,868 | B2 * | 2/2013 | Goodwin et al. | 381/17 |
| 2007/0269063 | A1 * | 11/2007 | Goodwin et al. | 381/310 |
| 2008/0144864 | A1 * | 6/2008 | Huon | 381/305 |
| 2008/0273708 | A1 * | 11/2008 | Sandgren et al. | 381/63 |

OTHER PUBLICATIONS

Gerzon, "Hierarchical Transmission of Multispeaker Stereo," IEEE Applications of Signal Processing to Audio and Acoustics, pp. 133-134 (Oct. 20, 1991).
Hawksford, "Scalable Multichannel Coding with HRTF Enhancement for DVD and Virtual Sound System," Journal of the Audio Engineering Society, Audio Engineering Society, New York, NY, US, vol. 50 (11), pp. 894-913 (Nov. 1, 2002).
Villemoes et al., "MPEG Surround: the forthcoming ISO standard for spatial audio coding," Proceedings of the International AES Conference, pp. 1-18 (Jun. 30, 2006).

* cited by examiner

*Primary Examiner* — Fan Tsang
*Assistant Examiner* — Eugene Zhao
(74) *Attorney, Agent, or Firm* — Drinker Biddle & Reath LLP

(57) ABSTRACT

The invention relates to a method for ordering spectral parameters of ambisonic components to be encoded $(A_1, \ldots, A_Q)$ originating from an audio scene comprising N signals $(Si_{i=1\ to\ N})$, in which N>1, comprising the following steps: calculation of the respective influence of at least some spectral parameters, taken from a set of spectral parameters to be ordered, on an angle vector defined as a function of energy and velocity vectors associated with Gerzon's criteria and calculated as a function of a reverse ambisonic transformation in relation to said quantified ambisonic components; and allocation of a precedence order to at least one spectral parameter as a function of the influence calculated for said spectral parameter compared to the other calculated influences.

10 Claims, 3 Drawing Sheets

AUDIO ENCODING AND DECODING METHOD AND ASSOCIATED AUDIO ENCODER, AUDIO DECODER AND COMPUTER PROGRAMS

CROSS-REFERENCE TO RELATED APPLICATIONS

This application is the U.S. national phase of the International Patent Application No. PCT/FR2008/050672 filed Apr. 16, 2008, which claims the benefit of French Application No. 07 03347 filed May 10, 2007, the entire content of which is incorporated herein by reference.

BACKGROUND OF THE INVENTION

The present invention relates to audio signal encoding devices, which are intended, in particular, to find a place in digitized and compressed audio signal storage or transmission applications.

The invention relates more precisely to hierarchical audio encoding systems having the capability of providing varied rates, by dividing up the information relating to an audio signal to be encoded into hierarchized subsets, whereby they can be used by order of importance with respect to the restitution quality of the audio signal. The criterion taken into account for determining the order is an optimization criterion (or rather a least degradation criterion) of the quality of the encoded audio signal. Hierarchical encoding is particularly suited to transmission over heterogeneous networks or those having available rates which are variable over time, or also to transmitting to terminals having different or variable characteristics.

The invention relates more particularly to the hierarchical encoding of 3D sound scenes. A 3D sound scene includes a plurality of audio channels corresponding to monophonic audio signals and is also referred to as spatialized sound.

An encoded sound scene is intended to be reproduced on a sound rendering system, which can include a ordinary headset, two speakers of a computer or also a Home Cinema 5.1 type of system with five speakers (one speaker near the screen and in front of the theoretical listener: one speaker to the left and one speaker to the right; behind the theoretical listener: one speaker to the left and one speaker to the right), or the like.

For example, consider an original sound scene comprising three distinct sound sources located at various locations in space. The signals describing this sound scene are encoded by an encoder. The data derived from this encoding is transmitted to the decoder, and then decoded. The decoded data is processed so as to generate five signals intended for the five speakers of the sound reproduction system in question. Each of the five speakers broadcasts one of the signals, the set of signals broadcast by the speakers synthesizing the 3D sound scene and therefore locating three virtual sound sources in space.

Spatial resolution or spatial accuracy measures the degree of fineness of the location of the sound sources in space. Increased spatial resolution enables finer positioning of the sound objects in the room and enables a broader restitution area around the listener's head.

Various techniques exist for encoding sound scenes.

For example, one technique used includes the determination of elements describing the sound scene, and then operations for compressing each of the monophonic signals. The data derived from these compressions and the description elements are then supplied to the decoder.

Rate adaptability (also called scalability) according to this first technique can thus be accomplished by adapting the rate during the compression operations, but it is carried out according to criteria for optimizing the quality of each signal considered individually. During the encoding operation, no account is taken of the spatial accuracy of the 3D scene resulting from the restitution of the various signals.

Another encoding technique, which is used in the "MPEG Audio Surround" encoder (cf. "Text of ISO/IEC FDIS 23003-1, MPEG Surround", ISO/IEC JTC1/SC29/WG11 N8324, July 2006, Klagenfurt, Austria), includes the extraction and encoding of spatial parameters from all of the monophonic audio signals on the various channels. These signals are then mixed to obtain a monophonic or stereophonic signal, which is then compressed by a conventional mono or stereo encoder (e.g., of the MPEG-4 AAC, HE-AAC type, etc.). At the decoder level, synthesis of the 3D sound scene is carried out from the spatial parameters and decoded mono or stereo signal.

With this other technique, rate adaptability can thus be achieved by using a hierarchical mono or stereo encoder, but it is carried out according to a criterion for optimizing the quality of the monophonic or stereophonic signal, and also does not either take account of the quality of the spatial resolution.

In addition, the PSMAC (Progressive Syntax-Rich Multichannel Audio Codec) method enables encoding of the signals from various channels by using the KLT Transform (Karhunen Loeve Transform), which is primarily useful for decorrelation of the signals and which corresponds to a principal components decomposition in a space representing the signal statistics. It makes it possible to distinguish the more energetic components from the less energetic components.

The rate adaptability is based on cancellation of the less energetic components and not at all by taking account of spatial accuracy.

Thus, although the known techniques yield good results in terms of rate adaptability, none of the known 3D sound scene encoding techniques enables rate adaptability on the basis of a criterion for optimizing spatial resolution during restitution of the 3D sound scene. Such adaptability would make it possible to guarantee that each reduction in rate would harm the positioning accuracy of the sound sources in space as little as possible.

Furthermore, none of the known 3D sound scene encoding techniques enables a rate adaptability which makes is possible to directly guarantee optimal quality, irrespective of the sound rendering system used for restitution of the 3D sound scene. The current encoding algorithms are defined to optimize quality with respect to a particular configuration of the sound reproduction system. As a matter of fact, in the case of the above-described "MPEG Audio Surround" encoder, for example, direct listening with a headset or two speakers, or also monophonic listening is possible. If it is desired to process the compressed bit stream with a 5.1 or 7.1-type sound reproduction system, additional processing must be implemented at the decoder level, e.g., by means of OTT (One-To-Two) boxes, in order to generate the five or seven signals from the two decoded signals. These boxes enable obtainment of the desired number of signals in the case of a 5.1 or 7.1-type sound reproduction system, but do not make it possible to reproduce the real spatial aspect. Furthermore, these boxes do not guarantee adaptability to sound reproduction systems other than those of the 5.1 or 7.1 type.

SUMMARY OF THE INVENTION

This invention aims to improve the situation. To that end, according to a first aspect, this invention aims to propose a method for ordering spectral parameters relating to respective spectral bands of ambisonic components to be encoded originating from an audio scene comprising N signals in which N>1, characterized in that it comprises the following steps:

a. calculation of the respective influence of at least some spectral parameters, taken from a set of spectral parameters to be ordered, on an angle vector defined as a function of energy and velocity vectors associated with Gerzon's criteria and calculated as a function of a reverse ambisonic transformation in relation to said quantified ambisonic components;

b. allocation of an order of precedence to at least one spectral parameter as a function of the influence calculated for said spectral parameter compared to the other calculated influences.

A method according to the invention thus makes it possible to order at least some of the spectral parameters of ambisonic components of the set to be ordered, on the basis of the relative importance of same in contributing to spatial accuracy.

The interactions between the signals and the effect thereof on spatial accuracy are taken into account in order to compress them conjointly.

The bit stream can thus be ordered so that each reduction in rate degrades the perceived spatial accuracy of the 3D sound scene as little as possible, since the elements which are least important from the standpoint of the contribution thereof are detected, so as to be placed at the end of the binary sequence (making it possible to minimize the defects produced by a subsequent truncation).

According to a method in accordance with the invention, the angles $\xi_v$ and $\xi_E$ associated with the velocity $\vec{V}$ and energy $\vec{E}$ vectors of Gerzon's criteria are used, as indicated below, in order to identify elements to be encoded which are least relevant in terms of the contribution of spatial accuracy to the 3D sound scene. Thus, contrary to common usage, the velocity $\vec{V}$ and energy $\vec{V}$ vectors are not used to optimize a sound reproduction system in question.

In one embodiment, calculation of the influence of a spectral parameter is carried out according to the following steps:

a. encoding a first set of spectral parameters of ambisonic components to be encoded according to a first rate;

b. determination of a first angle vector per spectral band;

c. determination of a second rate lower than said first one;

d. deletion of said current spectral parameter of the components to be encoded and encoding of the remaining spectral parameters of the components to be encoded according to a second rate;

e. determination of a second angle vector per spectral band;

f. calculation of a angle vector variation based on the determined deviations between the first and second angle vectors for the first and second rate per spectral band;

g. iteration of steps d to f for each of the spectral parameters of the set of spectral parameters of components to be encoded for ordering and determination of a minimum angle vector variation; the order of precedence assigned to the spectral parameter corresponding to the minimum variation being a minimum order of precedence.

This makes it possible, in a minimum number of calculations, to determine the spectral parameter of the component to be determined of which the contribution to spatial accuracy is minimum.

In one embodiment, steps a to g are repeated with a set of spectral parameters of components to be encoded for ordering, by deleting the spectral parameters for which an order of precedence was assigned.

In another embodiment, steps a to g are repeated with a set of spectral parameters of components to be encoded for ordering in which the spectral parameters for which an order of precedence was assigned are allocated a lower quantification rate when using a nested quantifier.

From among the spectral parameters of the ambisonic components to which orders of precedence have not yet been assigned, such iterative processes enable successive identification of those which contribute the least to spatial accuracy.

In one embodiment, a first coordinate of the energy vector is based on the formula:

$$\frac{\sum_{1\le i\le Q} Ti^2\cos\xi_i}{\sum_{1\le i\le Q} Ti^2},$$

a second coordinate of the energy vector is based on the formula:

$$\frac{\sum_{1\le i\le Q} Ti^2\sin\xi_i}{\sum_{1\le i\le Q} Ti^2},$$

a first coordinate of the velocity vector is based on the formula:

$$\frac{\sum_{1\le i\le Q} Ti\cos\xi_i}{\sum_{1\le i\le Q} Ti}$$

and a second coordinate of the velocity vector is based on the formula:

$$\frac{\sum_{1\le i\le Q} Ti\sin\xi_i}{\sum_{1\le i\le Q} Ti},$$

wherein the $T_i$, i=1 to Q represent signals determined on the basis of reverse ambisonic transformation in relation to said quantified spectral parameters according to the rate in question, and the $\xi_i$ i=1 to Q are specific angles.

In one embodiment, a first coordinate of a angle vector indicates an angle based on the sign of the second coordinate of the velocity vector and the arc cosine of the first coordinate of the velocity vector and according to which a second coordinate of an angle vector indicates an angle based on the sign of the second coordinate of the energy vector and the arc cosine of the first coordinate of the energy vector.

According to a second aspect, the invention proposes an ordering module comprising means for implementing a method according to the first aspect of the invention.

According to a third aspect, the invention proposes an audio encoder designed to encode a 3D audio scene comprising N respective signals in an outgoing bit stream, with N>1, comprising:

- a transformation module designed to determine, on the basis of N signals, spectral parameters relating to respective spectral bands of ambisonic components;
- an ordering module according to the second aspect of the invention, designed to order at least some of the spectral parameters of the ambisonic components;

a binary sequence-forming module designed to form a binary sequence comprising data indicating spectral parameters relating to respective spectral bands of ambisonic components to be encoded, based on the ordering carried out by the ordering module.

According to a fourth aspect, the invention proposes a computer program to be installed in an ordering module, said program comprising instructions for implementing the steps of a method according to the first aspect of the invention for executing the program by processing means of said module.

According to a fifth aspect, the invention proposes a binary sequence comprising data indicating spectral parameters relating to respective spectral bands of ambisonic components to be encoded, characterized in that this data is ordered according to an ordering method according to the first aspect of the invention.

According to a sixth aspect, the invention proposes a method of decoding an encoded bit stream according to a method according to the first aspect of the invention, with a view to determining a number Q' of audio signals for restituting a 3D audio scene by means of Q' speakers, according to which:

the bit stream is received;

encoding data is extracted, which indicates ambisonic components calculated on the basis of the N signals of the sound scene, and a reverse spatial transformation operation is carried out on said encoding data, which is designed to determine a number Q' of audio signals for restituting a 3D audio scene by means of the Q' speakers.

According to a seventh aspect, the invention proposes an audio decoder designed to decode an encoded bit stream according to a method according to the first aspect of the invention, with a view to determining a number Q' of audio signals for restituting a 3D audio scene by means of Q' speakers, comprising means for implementing the steps of a method according to the sixth aspect of the invention.

According to an eighth aspect, the invention proposes a computer program to be installed in a decoder designed to decode a encoded bit stream according to the first aspect of the invention, with a view to determining a number Q' of audio signals for restituting a 3D audio scene by means of Q' speakers, said program comprising instructions for implementing the steps of a method according to the sixth aspect of the invention during an execution of the program by processing means of said decoder.

BRIEF DESCRIPTION OF THE DRAWINGS

Other characteristics and advantages of the invention will become more apparent upon reading the following description. The latter is purely illustrative and should be read with reference to the appended drawings, in which.

DESCRIPTION OF THE PREFERRED EMBODIMENTS

Figure 1:
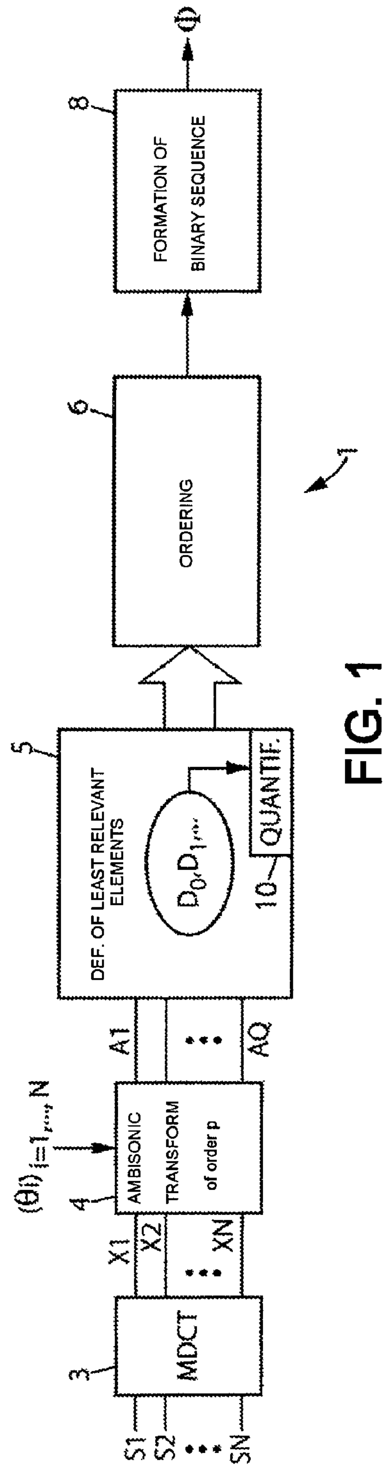
FIG. 1 shows an encoder in one embodiment of the invention.

FIG. 1 shows an audio encoder 1 in one embodiment of the invention.

The encoder 1 includes a time/frequency transformation module 3, a masking curve calculation module 7, a spatial transformation module 4, a module 5 for defining the least relevant elements to be encoded comprising a quantification module 10, an element-ordering module 6, a module 8 for forming a binary sequence, with a view to transmitting a bit stream $\phi$.

A 3D sound scene includes N channels over each of which a respective signal S1, . . . , SN is delivered.

Figure 2:
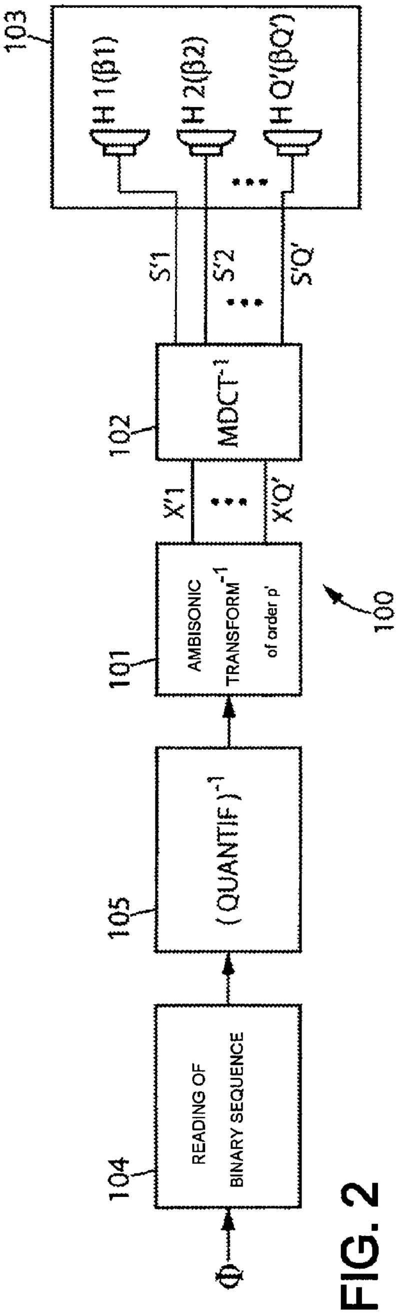
FIG. 2 shows a decoder in one embodiment of the invention.

FIG. 2 shows an audio decoder 100 in one embodiment of the invention.

The decoder 100 includes a binary sequence-reading module 104, a reverse quantification module 105, a reverse ambisonic transformation module 101 and a frequency/time transformation module 102.

The decoder 100 is designed to receive at the output the bit stream $\phi$ transmitted by the coder 1 and to deliver at the output Q' signals S'1, S'2, . . . , S'Q' intended to supply the Q' respective speakers H1, H2 . . . , HQ' of a sound reproduction system 103.

An angle $\beta i$ is associated with each speaker Hi, i=1 to Q', which indicates the angle of acoustic propagation from the speaker.

Gerzon's criteria are generally used to characterize the positioning of the virtual sound sources synthesized by the restitution of signals from the speakers of a given sound reproduction system.

These criteria are based on the study of the velocity and energy vectors of the acoustic pressures generated by a given sound reproduction system.

When a sound reproduction system includes L speakers, the signals, i=1 to L, generated by these speakers are defined by an acoustic pressure Ti and an acoustic propagation angle $\xi_i$.

The velocity vector $\vec{V}$ is then defined as:

$$\vec{V}=\begin{cases} x_V=\dfrac{\sum_{1\le i\le L} Ti\cos\xi_i}{\sum_{1\le i\le L} Ti} \\ y_V=\dfrac{\sum_{1\le i\le L} Ti\sin\xi_i}{\sum_{1\le i\le L} Ti} \end{cases}$$

A pair of polar coordinates $(r_v, \xi_v)$ exist such that:

$$\vec{V}=\begin{cases} x_V=\dfrac{\sum_{1\le i\le L} Ti\cos\xi_i}{\sum_{1\le i\le L} Ti}=r_V\cos\xi_V \\ y_V=\dfrac{\sum_{1\le i\le L} Ti\sin\xi_i}{\sum_{1\le i\le L} Ti}=r_V\sin\xi_V \end{cases} \quad \text{Equation (1)}$$

The energy vector $\vec{E}$ is defined as:

$$\vec{E}=\begin{cases} x_E=\dfrac{\sum_{1<i<L} Ti^2\cos\xi_i}{\sum_{1\le i\le L} Ti^2} \\ y_E=\dfrac{\sum_{1\le i\le L} Ti^2\sin\xi_i}{\sum_{1\le i\le L} Ti^2} \end{cases}$$

A pair of polar coordinates ($r_E$, $\xi_E$) exist such that:

$$\vec{E} = \begin{cases} x_E = \dfrac{\sum_{1\le i\le L} Ti^2 \cos\xi_i}{\sum_{1\le i\le L} Ti^2} = r_E\cos\xi_E \\ y_E = \dfrac{\sum_{1\le i\le L} Ti^2 \sin\xi_i}{\sum_{1\le i\le L} Ti^2} = r_E\sin\xi_E \end{cases} \quad \text{Equation (2)}$$

The conditions required to ensure that the positioning of the virtual sounds sources is optimal are defined by searching for the angles $\xi_i$ characterizing the position of the speakers of the sound reproduction system in question, and by verifying the below criteria, also known as Gerzon's criteria, which are:

criterion 1, relating to the accuracy of the sound image of the low-frequency source S: $\xi_v = \xi$; where $\xi$ the angle of propagation of the desired actual sourceSto be attained;

criterion 2, relating to the stability of the sound image of the low-frequency source S: $r_v = 1$;

criterion 3, relating to the accuracy of the sound image of the high-frequency source S: $\xi_E = \xi$;

criterion 4, relating to the stability of the sound image of the high-frequency source S: $r_E = 1$.

The operations described below in one embodiment of the invention use the Gerzon vectors in an application other than that consisting of searching for the best angles $\xi_i$, characterizing the position of the speakers of the sound reproduction system in question.

Operations Carried Out at the Encoder Level:

The time/frequency transformation module 3 of the encoder 1 receives at its input the N signals S1, . . . , SN of the 3D sound scene to be encoded.

Each signal Si, i=1 to N, is represented by the variation in the acoustic omnidirectional pressure Pi thereof and the angle θi of propagation of the acoustic wave in the space of the 3D scene.

The time/frequency transformation module 3 carries out a time/frequency transformation on each temporal frame of each of these signals indicating the various values assumed over time by the acoustic pressure Pi, which, in the present case, is a modified discrete cosine transform (MDCT).

Thus, for each of the signals Si, i=1 to N, the spectral representation Xi thereof is determined, which is characterized by M MDCT coefficients X(i, j), where j=0 to M−1. An MDCT coefficient X(i, j) thus represents the spectrum of the signal Si for the frequency band $F_j$.

The spectral representations Xi of the signals Si, i=1 to N are provided at the input of the spatial transformation module 4, which further receives at the input the angles θi of acoustic propagation characterizing the incoming signals Si.

The spatial transformation module 4 is designed to carry out the spatial transformation of the incoming signals provided, i.e., to determine the spatial components of these signals resulting from projection onto a spatial reference system dependent on the order of transformation. The order of a spatial transformation is related to the angular frequency according to which it "scans" the sound field.

In one embodiment, the spatial transformation module 4 carries out an ambisonic transformation, which provides a compact spatial representation of a 3D sound scene, by making projections of the sound field onto the associated spherical or cylindrical harmonic functions.

For more information about ambisonic transformations, reference may be made to the following documents: "Représentation de champs acoustiques, application à la transmission et à la reproduction de scenes sonores complexes dans un contexte multimedia", Doctoral thesis of the University of Paris 6, Jérôme Daniel, Jul. 31, 2001, "A highly scalable spherical microphone array based on an orthonormal decomposition of the sound field", Jens Meyer—Gary Elko, Vol. II—pp. 1781-1784 in Proc. ICASSP 2002.

Figure 3:
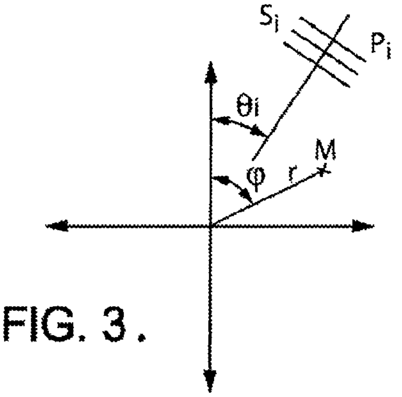
FIG. 3 illustrates the propagation of a plane wave in space.

With reference to FIG. 3, the following formula provides the infinite-order decomposition of a signal Si of the sound scene into cylindrical harmonics:

$$Si(r,\varphi) = Pi\cdot\left[J_0(kr) + \sum_{1\le m<\infty} 2\cdot j^m J_m(kr)\cdot(\cos m\cdot\theta i\cdot\cos m\cdot\varphi + \sin m\cdot\theta i\cdot\sin m\cdot\varphi)\right]$$

where ($J_m$) represent the Bessel functions, r the distance between the center of the frame and the position of a listener positioned at a point M, Pi the acoustic pressure of the signal Si, θi the angle of propagation of the acoustic wave corresponding to the signal Si and ϕ the angle between the position of the listener and the axis of the frame.

If the ambisonic transformation is of order p, for a 2D ambisonic transformation (in the horizontal plane), the ambisonic transform of a signal Si expressed in the temporal domain then includes the following 2p+1 components:

(Pi, Pi. cos θi, Pi. sin θi, Pi. cos 2θi, Pi. sin 2θi, Pi. cos 3θi, Pi. sin 3θi, . . . , Pi. cos pθi, Pi. sin pθi).

Hereinbelow, consideration has been given to a 2D ambisonic transformation. Nevertheless, the invention can be implemented with a 3D ambisonic transformation (in such a case, it is assumed that the speakers are arranged on a sphere).

In addition, the invention can be implemented with any order p of ambisonic transformation, e.g., p=2 or more.

The ambisonic components Ak, k=1 to Q=2p+1, considered in the frequency domain, each comprises M spectral parameters A(k,j), j=0 to M−1, relating respectively to the spectral bands $F_j$, such that:

if A is the matrix comprising the components Ak, k=1 to Q derived from the ambisonic transformation of order p of the signals Si, i=1 to N, Amb(p) is the ambisonic transformation matrix of order p for the 3D scene, and X is the matrix of the frequency components of the signals Si, i=1 to N, then:

$$\underline{A} = \begin{bmatrix} A(1,0) & A(1,1) & \dots & A(1,M-1) \\ A(2,0) & & & A(2,M-1) \\ \vdots & & & \vdots \\ A(Q,0) & A(Q,1) & \dots & A(Q,M-1) \end{bmatrix},$$

Amb(p)=[Amb(p)(i,j)], where i=1 to Q and j=1 to N, where: Amb(p)(1,j)=1, $$Amb(p)(i,j) = \sqrt{2}\cos\left[\left(\frac{i}{2}\right)\right]\theta_j$$

if i is even and $$Amb(p)(i,j) = \sqrt{2}\sin\left[\left(\frac{i-1}{2}\right)\right]\theta_j$$

if i is an odd number, i.e.

Equation (3)

$$\underline{Amb(p)} = \begin{bmatrix} 1 & 1 & \ldots & 1 \\ \sqrt{2}\cos\theta 1 & \sqrt{2}\cos\theta 2 & \ldots & \sqrt{2}\cos\theta N \\ \sqrt{2}\sin\theta 1 & \sqrt{2}\sin\theta 2 & \ldots & \sqrt{2}\sin\theta N \\ \sqrt{2}\cos 2\theta 1 & \sqrt{2}\cos 2\theta 2 & \ldots & \sqrt{2}\cos 2\theta N \\ \sqrt{2}\sin 2\theta 1 & \sqrt{2}\sin 2\theta 2 & \ldots & \sqrt{2}\sin 2\theta N \\ & & \ldots & \\ & & \ldots & \\ \sqrt{2}\cos p\theta 1 & \sqrt{2}\cos p\theta 2 & \ldots & \sqrt{2}\cos p\theta N \\ \sqrt{2}\sin p\theta 1 & \sqrt{2}\sin p\theta 2 & \ldots & \sqrt{2}\sin p\theta N \end{bmatrix}$$

and $$\underline{X} = \begin{bmatrix} X(1,0) & X(1,1) & \ldots & X(1, M-1) \\ X(2,0) & X(2,1) & \ldots & X(2, M-1) \\ \vdots & & & \vdots \\ X(N,0) & \ldots & \ldots & X(N, M-1) \end{bmatrix}$$

and $\underline{A} = \underline{Amb(p)} \times \underline{X}$.

The spatial transformation module 4 is designed to determine the matrix A by means of equation (3), based on the data X(i,j) and θi (i=1 to N, j=0 to M−1) which are supplied to it at the input.

The spectral parameters A(k,j), k=1 to Q and j=0 to M−1 of the ambisonic components Ak, k=1 to Q of this matrix A comprise the elements to be encoded in a binary sequence by the encoder 1.

The ambisonic components Ak, k=1 to Q are delivered to the module 5 for defining the least relevant elements.

This module 5 for defining the least relevant elements is designed for implementing operations, following execution of an algorithm on processing means of the module 5, with a view to defining the least relevant elements to be encoded and to order the elements to be encoded relative to one another.

This ordering of the elements to be encoded is later used during the formation of a bit sequence to be transmitted.

Figure 4:
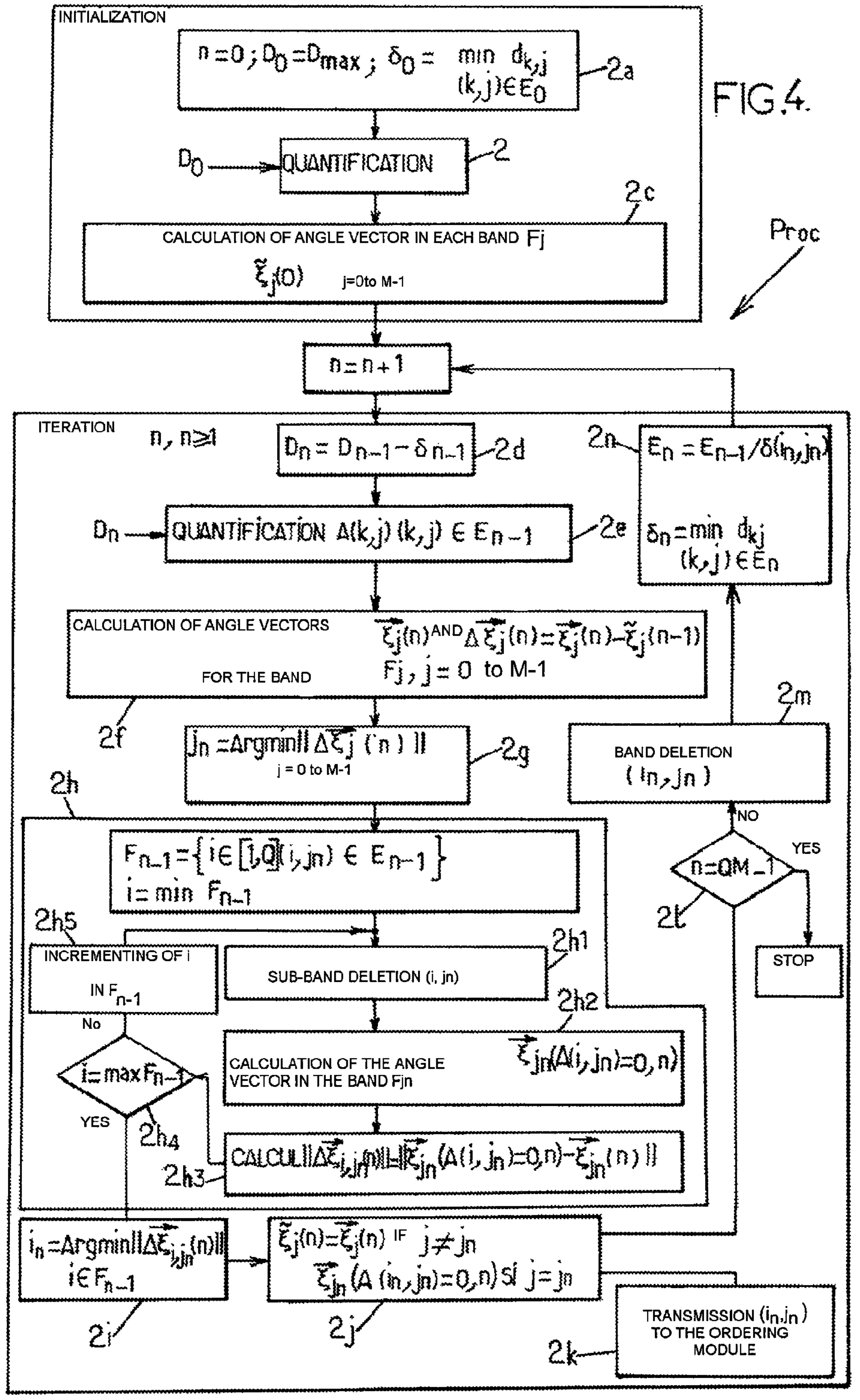
FIG. 4 is a flowchart showing steps of a process Proc in one embodiment of the invention.

The algorithm includes instructions which, when executed on processing means of the module 5, are designed to implement the steps of the process Proc described below with reference to FIG. 4.

Gerzon's criteria are based on the study of the velocity and energy vectors of the acoustic pressures generated by a sound reproduction system used.

Each of the coordinates $x_V$, $y_V$, $x_E$, $y_E$ indicated in equations 1 and 2 relating to the energy and velocity vectors associated with the Gerzon's criteria is an element of [−1, 1]. Therefore, a single pair ($\xi_V$, $\xi_E$) exists which verifies the following equations corresponding to the perfect case ($r_V$, $Y_E$)=(1, 1):

$$\frac{\sum_{1\le i\le L} Ti\cos\xi_i}{\sum_{1\le i\le L} Ti} = \cos\xi_V,\quad \frac{\sum_{1\le i\le L} Ti\sin\xi_i}{\sum_{1\le i\le L} Ti} = \sin\xi_V,$$

$$\frac{\sum_{1\le i\le L} Ti^2\cos\xi_i}{\sum_{1\le i\le =Ti} Ti^2} = \cos\xi_E \text{ and } \frac{\sum_{1\le i\le L} Ti^2\sin\xi_i}{\sum_{1\le i\le L} Ti^2} = \sin\xi_E.$$

The angles $\xi_V$ and $\xi_E$ of this single pair are thus defined by the following equations (equations (4)):

$$\xi_V = \mathrm{sign}\left(\frac{\sum_{1\le i\le L} Ti\sin\xi_i}{\sum_{1\le i\le L} Ti}\right)\cdot\arccos\left(\frac{\sum_{1\le i\le L} Ti\cos\xi_i}{\sum_{1\le i\le L} Ti}\right)$$

$$\xi_E = \mathrm{sign}\left(\frac{\sum_{1\le i\le L} Ti^2\sin\xi_i}{\sum_{1\le i\le L} Ti^2}\right)\cdot\arccos\left(\frac{\sum_{1\le i\le L} Ti^2\cos\xi_i}{\sum_{1\le i\le L} Ti^2}\right)$$

Hereinafter, the generalized vector of Gerzon angles will be referred to as the vector $\vec{\xi}$ such that $$\vec{\xi} = \begin{pmatrix} \xi_V \\ \xi_E \end{pmatrix}.$$

When executed on the processing means of the module 5 of determination of the least relevant elements, the algorithm includes instructions designed for implementing the steps of the process Proc described below with reference to FIG. 4.

Process Proc

The principle of the process Proc is such that a calculation is made of the respective influence of at least some spectral parameters on an angle vector defined as a function of energy and velocity vectors associated with Gerzon criteria and calculated as a function of a reverse ambisonic transformation of said quantified ambisonic components. And an order of precedence is assigned to at least one spectral parameter based on the influence calculated for said spectral parameter in comparison with the other calculated influences.

The process, as detailed with regard to one embodiment, is as follows:

Initialization (n=0)

Step 2a:

A rate $D_0=D_{max}$ is defined and this rate is allocated among the elements to be encoded A(k,j), for (k,j)∈$E_0$={(k,j) such that k=1 to Q and j=0 to M−1}.

The rate assigned to the element to be encoded A(k,j), (k,j)∈$E_0$, during this initial allocation, is designated as $d_{k,j}$ (the sum of these rates $d_{k,j|i=1\ to\ Q,\ j=0\ to\ M-1}$ is equal to $D_0$) and $\delta_0=\min d_{k,j}$, for (k,j)∈$E_0$.

Step 2b:

Then, each element to be encoded A(k,j), (k,j)∈$E_0$ is quantified by the quantification module 10 based on the rate $d_{k,j}$ assigned allocated to same in step 2a.

$\overline{A}$ is the matrix of the elements $\overline{A}$(k, j), k=1 to Q and j=0 to M−1. Each element $\overline{A}$(k, j), is the result of quantifying the ambisonic component A(k) with the rate $d_{k,j}$ of the parameter A(k,j) related to the spectral band $F_j$. The element $\overline{A}$(k, j) thus defines the quantified value of the spectral representation for the frequency band $F_j$ of the ambisonic component in question.

$$\overline{A} = \begin{bmatrix} \overline{A}(1,0) & \overline{A}(1,1) & \ldots & \overline{A}(1, M-1) \\ \overline{A}(2,0) & & & \overline{A}(2, M-1) \\ \vdots & & & \vdots \\ \overline{A}(Q,0) & \overline{A}(Q,1) & \ldots & \overline{A}(Q, M-1) \end{bmatrix},$$

Step 2c:

Next, ambisonic decoding of order p such that 2p+1=Q is carried out on these quantified ambisonic component $\overline{A}(k, j)$, k=1 to Q and j=0 to M−1, which corresponds to a standard system of N speakers, in order to determine the acoustic pressures T1*i*, i=1 to N of the N sound signals obtained as a result of this ambisonic decoding.

In the case in question, AmbInv(p) is the reverse ambisonic transformation matrix of order p (or ambisonic decoding of order p) delivering N signals T11 . . . , T1N corresponding to N respective speakers H'1, . . . , H'N, which are evenly arranged around one point. Therefore, the matrix AmbInv(p) is deduced from the transposition of the matrix Amb(p,N), which is the ambisonic decoding matrix resulting from the encoding of the sound scene defined by the N sources corresponding to the N speakers H'1, . . . , H'N and arranged in the positions $\xi_1, \ldots, \xi_N$, respectively. Thus, it can be written that:

$$AmbInv(p) = \frac{1}{N} Amb(p, N)^t.$$

T1 is the matrix of the spectral components T1(*i,j*) of the signals T1*i*, i=1 to N relating to the frequency bands $F_j$, j=0 to M−1. These spectral components are derived from the reverse ambisonic transformation of order p applied to the quantified ambisonic components $\overline{A}(k, j)$, k=1 to Q and j=0 to M−1.

$$\underline{T1} = \begin{bmatrix} T1(1,0) & T1(1,1) & \ldots & T1(1, M-1) \\ T1(2,0) & T1(2,1) & \ldots & T1(2, M-1) \\ \vdots & & & \vdots \\ T1(N,0) & \ldots & \ldots & T1(N, M-1) \end{bmatrix}$$

and we have $$\underline{T1} = AmbInv(p) \times \underline{\overline{A}} = \frac{1}{N} Amb(p, N)^t \times \underline{\overline{A}} \qquad \text{Equation (5)}$$

Thus, the components T1(*i,j*), i=1 to N depend on the quantification error relating to the quantification in question of the ambisonic components A(k,j), k=1 to Q and j=0 to M−1 (as a matter of fact, each quantified element $\overline{A}(k, j)$ is the sum of the spectral parameter A(k,j) of the ambisonic component being quantified and the quantification noise relating to said parameter).

For each frequency band, $F_j$, j=0 to M−1, the Gerzon angle vector $\xi(0)$ which was generalized upon initialization of the process Proc (n=0), is calculated, with the help of the equations (4), as a function of the spectral components T1(*i,j*), i=1 to N and j=0 to M−1, which were determined following the ambisonic decoding:

$$\vec{\xi}_j(0) = \begin{pmatrix} \xi_{Vj} \\ \xi_{Ej} \end{pmatrix} \text{ where } \xi_i = \frac{2\pi(i-1)}{N},\ i = 1 \text{ to } N:$$

$$\xi_{Vj} = \text{sign}\left(\frac{\sum_{1\le i\le N} T1(i,j)\sin\xi_i}{\sum_{1\le i\le N} T1(i,j)}\right) \cdot \arccos\left(\frac{\sum_{1\le i\le N} T1(i,j)\cos\xi_i}{\sum_{1\le i\le N} T1(i,j)}\right)$$

-continued $$\xi_{Ej} = \text{sign}\left(\frac{\sum_{1\le i\le Q} T1(i,j)^2\sin\xi_i}{\sum_{1\le i\le Q} T1(i,j)^2}\right) \cdot \arccos\left(\frac{\sum_{1\le i\le Q} T1(i,j)^2\cos\xi_i}{\sum_{1\le i\le Q} T1(i,j)^2}\right).$$

And $\xi(0)=\vec{\xi}_j(0)$ is defined.

It is noted that consideration has been given here to an ambisonic decoding matrix for a standard sound reproduction device which comprises a number of speakers equal to the number of input signals, which simplifies the calculation of the ambisonic decoding matrix. Nevertheless, this step can be implemented while when using an ambisonic decoding matrix corresponding to non-standard sound reproduction devices and also for a number of speakers which is different from the number of input signals.

Iteration No. 1 (n=1)

Step 2d:

A rate $D_1=D_0-4$ and this rate $D_1$ is allocated among the elements to be encoded A(k,j), for $(k,j)\in E_0$ are defined.

Step 2e:

Then, each element to be encoded A(k,j), for $(k,j)\in E_0$ is quantified by the quantification module 10 based on the rate which was allocated thereto in step 2d.

$\overline{A}$ is now the updated matrix for the quantified elements A(k,j), for $(k,j)\in E_0$ each resulting from this last quantification according to the global rate $D_1$, of the parameters A(k,j).

Step 2f:

In a way similar to that described previously in step 2c, after calculating a new ambisonic decoding of order p carried out as a function of the quantified elements with the global rate $D_1$, and for iteration No. 1 of the process Proc, a first generalized Gerzon angle vector $\vec{\xi}_j(1)$ in each frequency band is calculated as a function of the spectral components T1(*i,j*), i=1 to N and j=0 to M−1, which were determined following the new ambisonic decoding, using equation (4).

Next, the vector $\Delta\vec{\xi}_j(1)$ is calculated, which is equal to the difference between the Gerzon angle vector $\xi_j(0)$ calculated in step 2c of the initialization operation and the generalized Gerzon angle vector $\vec{\xi}_j(1)$ calculated at step 2f of iteration No. 1:

$$\Delta\vec{\xi}_j(1)=\vec{\xi}_j(1)-\xi(0), \text{ j=0 to M−1}$$

Step 2g:

In each frequency band $F_j$, the norm $\|\Delta\vec{\xi}_j(1)\|$ for the variation $\Delta\vec{\xi}_i(1)$, j=0 to M−1 is calculated.

This norm represents the variation in the generalized Gerzon angle vector following the reduction in the rate from $D_0$ to $D_1$ in each frequency band $F_j$.

The frequency band $Fj_1$ index is determined to be $j_1$, such that the norm $\|\Delta\vec{\xi}_{j1}(1)$ for the Gerzon angle variation calculated in the frequency band $Fj_1$ such that $F_{j1}$ is less than or equal to each norm $\|\Delta\vec{\xi}_{j1}(1)$ calculated for each frequency band $F_j$, j=0 to M−1. Therefore, $$j_1 = \arg\min_{j=0 \ldots M-1} \|\Delta\vec{\xi}_j(1)\|.$$

Step 2h:

Consideration will now be given to the spectral parameters of the ambisonic components relating to the spectral band $F_{j1}$, namely the parameters $A(k,j_1)$, where $k \in F_0=[1,Q]$.

And the following steps 2h1 to 2h5 are reiterated for any $i \in F_0$ considered alternately from 1 to Q;

2h1—it is assumed that the sub-band $(i,j_1)$ is deleted for operations 2h2 to 2h4; therefore, it is assumed that $A(i,j_1)$ is zero and that the corresponding quantified element $\overline{A}(i, j_i)$ is also zero;

2h2—In a way similar to that described previously in step 2c, after calculating an ambisonic decoding of order p carried out as a function of the quantified elements with the global rate $D_1$($\overline{A}(i, j_i)$ being zero), the generalized Gerzon angle vector $\vec{\xi}_{j1}(A(i,j_1)=0, 1)$ in the frequency band is determined as a function of the spectral components $T\mathbf{1}(i,j)$, i=1 to N and j=0 to M−1, which were determined following said ambisonic decoding, using equation (5).

2h3—Next, the vector $\Delta\vec{\xi}_{ij_1}(1)$ is calculated, which represents the difference in the frequency band $F_{j1}$ between the generalized Gerzon angle vector $\vec{\xi}_{j1}(A(i,j_1=0, 1)$ calculated above, and the generalized Gerzon angle vector $\vec{\xi}_{j_1}(1)$ calculated in step 2f of iteration No. 1 above: $\Delta\vec{\xi}_{ij_1}(1)=\xi_{j_1}(A(i,j_1)=0, 1)-\vec{\xi}_{j_1}(1)$. Next the norm $\|\Delta\vec{\xi}_{ij_1}(1)\|$ of the vector $\Delta\vec{\xi}_{ij_1}(1)$: $\|\Delta\vec{\xi}_{ij_1}(1)\|=\|\vec{\xi}_{j_1}(A(i,j_1)=0, 1)-\vec{\xi}j_1(1)\|$ is calculated.

This norm represents the variation in the generalized Gerzon angle vector in the frequency band $F_{j1}$, when, for a rate D1, the frequency ambisonic component $A(i,j_1)$ is deleted.

2h4—If $i \neq \max F_0$, then it is assumed that the sub-band $(i,j_1)$ is no longer deleted and one passes on to step 2h5. If $i=\max F_0$, then it is assumed that the sub-band $(i,j_1)$ is no longer deleted and one passes on to step 2i.

2h5—In set $F_0$, i is incremented, and steps 2h1 to 2h4 are repeated for the value of i thus updated, up to $i=\max F_0$.

In this way, Q values are obtained for the variation in the generalized Gerzon angle $\|\Delta\vec{\xi}_{ij_1}(1)\|$, for each $i \in F_0=[1, Q]$.

Step 2i:

The values $\|\Delta\vec{\xi}_{ij_1}(1)\|$, for each $i \in F_0=[1, Q]$ are compared to one another, the minimum value is identified from among these values and the index $i_1 \in F_0$ is determined, which corresponds to the minimum value, namely $$i_1 = \underset{i \in F_0}{\operatorname{argmin}} \|\Delta\vec{\xi}_{ij_1}(1)\|.$$

The component $A(i_1, j_1)$ is thus identified as the element to be encoded of least importance to spatial accuracy, as compared with the other elements to be encoded $A(k,j)$, $(k,j) \in E_0$.

Step 2j:

For each spectral band $F_j$, the generalized Gerzon angle vector $\vec{\xi}_j(1)$ derived from iteration 1, and calculated for a rate $D_1$, is redefined:

$$\xi_j(1)=\vec{\xi}_j(1) \text{ if } j \in [0, M-1] \backslash \{j_1\};$$

$$\xi_{j1}(1)=\vec{\xi}_{j1}(A(i_1,j_1)=0, 1) \text{ if } j=j_1.$$

This redefined generalized Gerzon angle vector, established for a quantification rate equal to $D_1$, takes account of the deletion of the element to be encoded $A(i_1, j_1)$, and will be used for the following iteration of the process Proc.

Step 2k:

The identifier for the pair $(i_1, j_1)$ is delivered to the ordering module 6 as the result of the first iteration of the process Proc.

Step 2m:

The element to be encoded $A(i_1, j_1)$ is then deleted from the set of elements to be encoded in the remainder of the process Proc.

The set $E_1=E_0\backslash(i_1,j_1)$ is defined.

$\delta_1=\min d_{k,j}$ is defined for $(k,j) \in E_1$.

In an iteration No. 2 of the process Proc, steps similar to steps 2d to 2n indicated above are repeated.

The process Proc is repeated as many times as desired to order, relative to one another, some or all of the elements to be encoded $A(k,j)$, $(k,j) \in E_1$ which remain to be ordered.

Thus, steps 2d to 2n described above are repeated for an $n^{th}$ iteration:

Iteration n (n>1):

$E_{n-1}=E_0\backslash\{(i_1 j_1), \ldots, (i_{n-1} j_{n-1})\}$.

The elements to be encoded $A(k,j)$, for $(k,j) \in E_0\backslash E_{n-1}$ were deleted during steps 2m of the preceding iterations.

Step 2d:

A rate $D_n=D_{n-1}-\delta_{n-1}$, and an allocation of this rate $D_n$ among the elements to be encoded $A(k,j)$, for $(k,j) \in E_{n-1}$ are defined.

Hereinafter, when calculating the ambisonic decodings, it is assumed, therefore, that the quantified elements $\overline{A}(k, j)$, for $(k,j) \in E_0\backslash E_{n-1}$ are zero.

Step 2e:

Then, each element to be encoded $A(k,j)$, $(k,j) \in E_{n-1}$ is quantified by the quantification module 10 based on the rate allocated in step 2d above.

The result of this quantification of the element to be encoded $A(k,j)$ is $\overline{A}(k, j)$, $(k,j) \in E_{n-1}$.

Step 2f:

In a way similar to that described previously for iteration 1, after calculation of an ambisonic decoding of order p carried out on the basis of the quantified elements with the global rate $D_n$ (it was thus assumed during this ambisonic decoding that the components $\overline{A}(i_1, j_1), \ldots, \overline{A}(i_{n-1}, j_{n-1})$ are zero), a first generalized Gerzon angle vector $\vec{\xi}_j(n)$ each frequency band $F_j$ is calculated, for the iteration n of the process Proc, based on the spectral components $T\mathbf{1}i$, i=1 to N, determined following said ambisonic decoding, using equation (5).

Next, the vector $\Delta\vec{\xi}_j(n)$, which is equal to the difference between the Gerzon angle vector $\vec{\xi}_j(n-1)$ calculated in step 2j of iteration n−1 and the generalized Gerzon vector angle $\vec{\xi}_j(n)$ calculated at the present step: $\Delta\vec{\xi}_j(n)=\vec{\xi}_j(n)-\vec{\xi}_j(n-1)$, j=0 to M−1.

Step 2g:

In each frequency band the norm $\|\Delta\vec{\xi}_j(n)\|$ of the variation $\Delta\vec{\xi}_j(n)$, j=0 to M−1, is calculated.

This norm represents the variation in the generalized Gerzon angle vector in each frequency band $F_j$, following the reduction in the rate from $D_n$ to $D_{n-1}$ (the parameters $A(i_1, j_1), \ldots, A(i_{n-1}, j_{n-1})$ and $\overline{A}(i_1, j_1), \ldots, \overline{A}(i_{n-1}, j_{n-1})$ being deleted).

The frequency band $F_{jn}$ is determined to be $j_n$, such that the norm $\|\Delta\vec{\xi}_{j_n}(n)\|$ for the variation in the Gerzon angle vector calculated in the frequency band $F_{jn}$ is less than or equal to each norm $\|\Delta\vec{\xi}_j(n)\|$ calculated for each frequency band $F_j$, j=0 to M−1. Thus $$j_n = \arg\min_{j=0 \ldots M-1} \|\Delta\vec{\xi}_j(n)\|.$$

Step 2h: Consideration will now be made to the spectral parameters of the ambisonic components relating to the spectral band $F_{jn}$, namely the parameters $A(k, j_n)$, where $k \in F_{n-1} = \{i \in [1, \ldots, Q]$, such that $(i, j_n) \in E_{n-1}\}$.

The following steps 2h1 to 2h5 are repeated for any $i \in F_{n-1}$ considered alternately from the smallest element of the set $F_{n-1}$ ($\min F_{n-1}$) to the largest element of the set $F_{n-1}$ ($\max F_{n-1}$):

2h1—it is assumed that the sub-band $(i, j_n)$ is deleted for operations 2h2 to 2h4: therefore, it is assumed that $A(i,j_n)$ is zero and that the corresponding quantified element $\overline{A}(i, j_n)$ is also zero;

2h2—In a way similar to that described previously in step 2c, after calculation of an ambisonic decoding of order p, which was carried out on the basis of the quantified elements with the global rate $D_n$($\overline{A}(i, j_n)$ being zero), the generalized Gerzon angle vector designated as $\vec{\xi}_{j_n}(A(i,j_n)=0, n)$ is calculated in the frequency band $F_{jn}$ on the basis of the spectral components $T\mathbf{1}(i,j)$ i=1 to N and j=0 to M−1, which were determined following said ambisonic decoding, using equation (5).

2h3—Next, the vector $\Delta\vec{\xi}_{ij_n}(n)$ is calculated, which is equal to the difference, in the frequency band $F_{jn}$, between the generalized Gerzon angle vector $\vec{\xi}_{j_n}(A(i,j_n)=0, n)$ calculated above at 2h2, and the generalized Gerzon angle vector $\vec{\xi}_{j_n}(n)$ calculated at step 2f of iteration n above: $\Delta\vec{\xi}_{ij_n}(n) = \vec{\xi}_{j_n}(A(i,j_n)=0, n) - \vec{\xi}_{j_n}(n)$.

Then, the norm $\|\Delta\vec{\xi}_{ij_n}(n)\|$ of the vector $\Delta\vec{\xi}_{ij_n}(n)$: $\|\Delta\vec{\xi}_{ij_n}(n)\| = \|\vec{\xi}_{j_n}(A(i,j_n)=0, n) - \vec{\xi}_{j_n}(n)\|$ is calculated.

This norm represents the variation, in the frequency band $F_{jn}$, of the generalized Gerzon angle vector and for a rate $D_n$, due to the deletion of the ambisonic component $A(i, j_n)$ during the $n^{th}$ iteration of the process Proc.

2h4—If $i \neq \max F_{n-1}$, it is assumed that the sub-band $(i, j_n)$ is no longer deleted and one proceeds to step 2h5. If $I = \max F_{n-}$, it is assumed that the sub-band $(i, j_n)$ is no longer deleted and one proceeds to step 2i.

2h5—In set $F_{n-1}$, i is incremented, and steps 2h1 to 2h4 are repeated for the value of i thus updated, until reaching $i = \max F_{n-1}$.

Thus, for each $i \in F_{n-1}$, a value $\|\Delta\vec{\xi}_{ij_n}(n)\|$ is obtained, which represents the variation in the generalized Gerzon angle vector in the frequency band $F_{jn}$, due to the deletion of the component $A(i, j_n)$.

Step 2i:

The values $\|\Delta\vec{\xi}_{ij_n}(n)\|$ for each $i \in F_{n-1}$ are compared to one another, the minimum value is identified from among these values and the index $i_n \in F_n$ is determined, which corresponds to the minimum value, namely $$i_n = \underset{i \in F_n}{\operatorname{argmin}} \|\Delta\vec{\xi}_{ij_n}(n)\|.$$

The component $A(i_n, j_n)$ is thus identified as the element to be encoded of least importance to spatial accuracy, as compared with the other elements to be encoded $A(k,j)$, $(k,j) \in F_{n-1}$.

Step 2j:

For each spectral band $F_j$, a generalized Gerzon angle vector $\vec{\xi}_j(n)$ derived from iteration n is defined:

$$\vec{\xi}_j(n) = \vec{\xi}_j(n) \text{ if } j \in [0, M-1] \setminus \{j_n\};$$

$$\vec{\xi}_{j_n}(n) = \vec{\xi}_{j_n}(A(i_n j_n)=0, n) \text{ if } j = J_n.$$

This redefined generalized Gerzon angle, which was established for a quantification rate equal to $D_n$, takes account of the deletion of the element to be encoded $A(i_n, j_n)$, and will be used for the following iteration.

Step 2k:

The identifier for the pair $(i_n, j_n)$ is delivered to the ordering module 6 as the result of the $n^{th}$ iteration of the process Proc.

Step 2m:

The band $(i_n, j_n)$ is then deleted from the set of elements to be encoded following the process Proc, i.e., the element to be encoded $A(i_n, j_n)$ is deleted.

The set $E_n = E_{n-1} \setminus (i_n, j_n)$ is defined. The elements to be encoded $A(i, j)$ with $(i,j) \in E_n$ remain to be ordered. The elements to be encoded $A(i, j)$ with $(i,j) \in \{(i_1,j_1), \ldots, (i_n, j_n)\}$ were already ordered during iterations 1 to n.

The process Proc is repeated r times and, at a maximum, Q*M−1 times.

Thus, precedence indices are next assigned by the ordering module 6 to the various elements to be encoded, with a view to inserting encoding data into a binary sequence.

Ordering of the Elements to be Encoded and Formation of a Binary Sequence:

In one embodiment wherein the ordering of the elements to be encoded is carried out by the ordering module 6, on the basis of the results successively supplied by the successive iterations of the process Proc implemented by the module 5 for defining the least relevant elements to be encoded, the ordering module 6 defines an order for said elements to be encoded, which conveys the importance of the elements to be encoded to spatial accuracy.

Figure 5:
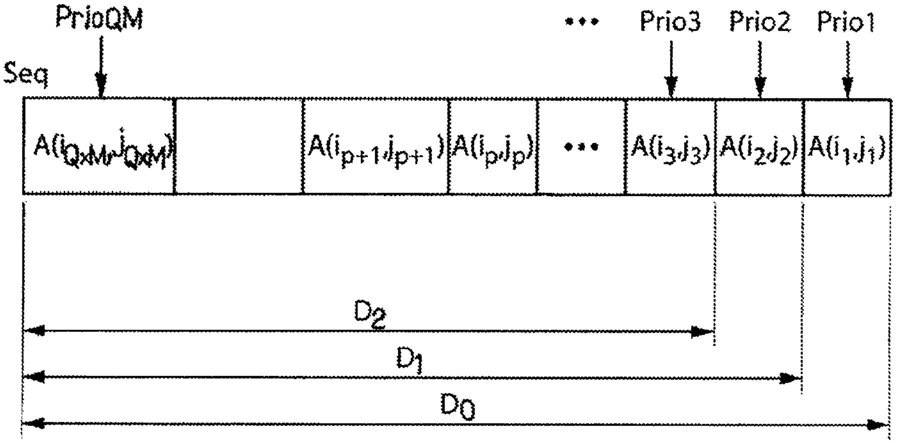
FIG. 5 shows the ordering of the elements to be encoded and a binary sequence Seq constructed in one embodiment of the invention.

With reference to FIG. 5, the element to be encoded $A(i_1, j_1)$, corresponding to the pair $(i_1, j_1)$, which was determined during the first iteration of the process Proc, is considered to be the least relevant to spatial accuracy. Therefore, it is assigned a minimal precedence index Prio1 by module 5.

The element to be encoded $A(i_2, j_2)$, corresponding to the pair $(i_2, j_2)$, which was determined during the second iteration of the process Proc, is considered to be the element to be encoded which is least relevant to spatial accuracy, after the one assigned the precedence Prio1. It is therefore assigned a minimal precedence index Prio2, with Prio2>Prio1. The ordering module 6 thus successively orders r elements to be encoded, each assigned indices of increasing precedence Prio1, Prio2 to Prio r.

The elements to be encoded which have not been assigned an order of precedence during an iteration of the process Proc are more important to spatial accuracy than the elements to be encoded to which an order of precedence has been assigned.

When r is equal to Q*M−1 times, the set of elements to be encoded is ordered one-by-one.

Hereinafter, it is assumed that the number of iterations r of the process Proc carried out is equal to Q*M−1 times.

The order of precedence assigned to an element to be encoded $A(k,j)$ is likewise assigned to the element to be encoded on the basis of the result $\overline{A}(k, j)$ of the quantification of this element to be encoded. The encoded element corresponding to the element to be encoded $A(k,j)$ is likewise denoted below as $\overline{A}(k, j)$.

The binary sequence-forming module 8 forms a binary sequence Seq corresponding to one frame of each of the signals Si, i=1 to N by successively integrating therein encoded elements $\overline{A}(k, j)$ by decreasing order of assigned indices of precedence, the binary sequence Seq being transmitted in the bit stream $\phi$.

Thus, the formed binary sequence Seq is ordered in accordance with the ordering carried out by module 6.

In the embodiment considered above, deletion of a spectral component from an element to be encoded A(i,j) occurs upon each iteration of the process Proc.

In another embodiment, a nested quantifier is used for the quantification operations. In such a case, the spectral component of an element to be encoded A(i,j), which is identified as least important to spatial accuracy during an iteration of the process Proc, is not deleted, but a lower rate is assigned to the coding of this component in relation to the coding of the other spectral components of elements to be encoded which remain to be ordered.

The encoder 1 is thus an encoder which enables rate adaptability, which takes account of the interactions between the various monophonic signals. It makes it possible to define compressed data, thereby optimizing the perceived spatial accuracy.

Operations Carried Out at the Decoder Level

The decoder 100 includes a binary sequence reading module 104, a reverse quantification module 105, a reverse ambisonic transformation module 101 and a frequency/time transformation module 102.

The decoder 100 is designed to receive at the input the bit stream ϕ transmitted by the encoder 1 and to deliver at the output Q' signals S'1, S'2, . . . , S'Q' intended to supply the Q' respective speakers H1, . . . , HQ' of a sound reproduction system 103. In one embodiment, the number of speakers Q' can be different from the number Q of ambisonic components transmitted.

Figure 6:
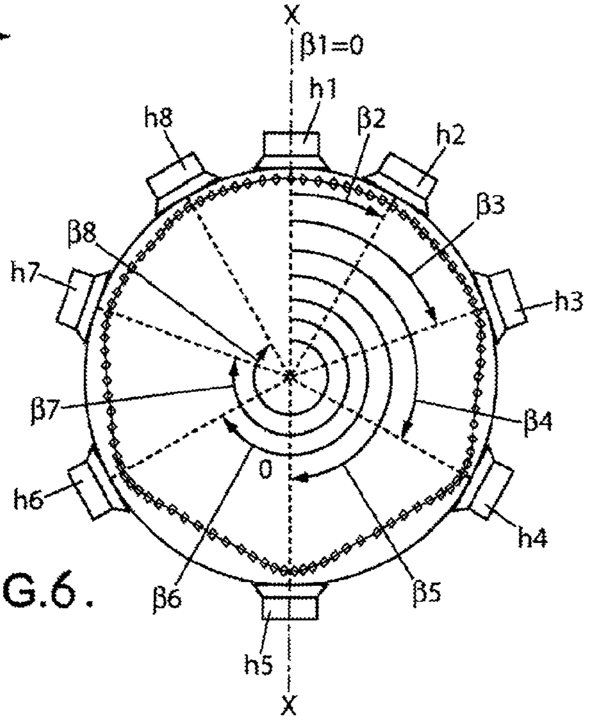
FIG. 6 shows an exemplary configuration of a sound reproduction system comprising 8 speakers h1, h2, . . . , h8.

To illustrate, p=2, i.e., Q=5, and Q'=8. The configuration of a sound reproduction system comprising 8 speakers h1, h2, . . . , h8 is shown in FIG. 6.

The binary sequence reading module 104 extracts of the binary sequence ϕ received data indicating the specific quantification indices for some of the elements $\overline{A}$(k, j), k=1 to Q and j=0 to M−1, and provides same at the input to the reverse quantification module 105.

The reverse quantification module 105 carries out a reverse quantification operation.

The elements of the matrix $\overline{A}$' of elements $\overline{A}$'(k, j), k=1 to Q and j=0 to M−1 are determined, such that $\overline{A}$'(k, j)=$\overline{A}$(k, j) when the sequence received comprised data indicating the quantification index of the $\overline{A}$(k, j) element derived from the encoding of the parameters A(k,j) of the ambisonic components by the decoder 100 and $\overline{A}$'(k, j)=0 when the sequence received did not comprise any data indicating the index of quantification of the element $\overline{A}$(k, j) (e.g., this data has been cut during transmission of the sequence from a streaming server in order to be adapted to the available rate in the network and/or to the characteristics of the terminal).

The reverse spatial transformation module 101 is designed to determine the elements X'(i,j), i=1 to Q', j=0 to M−1 of the matrix X' defining the M spectral coefficients X'(i,j), i=1 to Q', j=0 to M−1 of each of the Q' signals S'i, from the decoded ambisonic components A'(k, j), k=1 to Q and j=0 to M−1 determined by the reverse quantification module 105.

AmbInv(p',Q') is the reverse ambisonic transformation module of order p'=p for the 3D scene, which is designed to determine the Q' signals S'i, i=1 to Q', intended for the Q' speakers of the sound reproduction system associated with the decoder 100, from the Q ambisonic components received. The angles βi, for i=1 to Q', indicate the angle of acoustic propagation from the speaker Hi. In the example shown in FIG. 6, these angles correspond to the angles between the axis of propagation of a sound emitted by a speaker and the axis XX.

X' is the matrix of the spectral components X'(i,j) of the signals Si', i=1 to Q' relating to the frequency bands $F_j$, j=0 to M−1. Thus:

$$\underline{\overline{A}'} = \begin{bmatrix} \overline{A}'(1,0) & \overline{A}'(1,1) & \dots & \overline{A}'(1,M-1) \\ \overline{A}'(2,0) & & & \overline{A}'(2,M-1) \\ \vdots & & & \vdots \\ \overline{A}'(Q,0) & \overline{A}'(Q,1) & \dots & \overline{A}'(Q,M-1) \end{bmatrix}, \qquad \text{Equation (6)}$$

$$\underline{AmbInv(p',Q')} = \begin{bmatrix} 1 & \frac{1}{\sqrt{2}}\cdot\cos\beta 1 & \cdot\frac{1}{\sqrt{2}}\cdot\sin\beta 1 & \dots & \frac{1}{\sqrt{2}}\cdot\sin p'\beta 1 \\ 1 & \frac{1}{\sqrt{2}}\cdot\cos\beta 2 & \dots & \dots & \frac{1}{\sqrt{2}}\cdot\sin p'\beta 2 \\ \vdots & \vdots & \vdots & \vdots & \vdots \\ 1 & \frac{1}{\sqrt{2}}\cdot\cos\beta Q' & \dots & \dots & \frac{1}{\sqrt{2}}\cdot\sin p'\beta Q' \end{bmatrix}$$

and $$\underline{X'} = \begin{bmatrix} X'(1,0) & X'(1,1) & \dots & X'(1,M-1) \\ X'(2,0) & X'(2,1) & \dots & X'(2,M-1) \\ \vdots & & & \vdots \\ X'(Q',0) & \dots & \dots & X'(Q',M-1) \end{bmatrix}$$

and we have $\underline{X'} = \underline{AmbInv(p',Q')} \times \underline{\overline{A}'}$.

The reverse spatial transformation module 100 is designed to determine the spectral coefficients X'(i,j), i=1 to Q', j=0 to M−1 of the matrix X' using equation (6).

Once determined, these elements X'(i,j), i=1 to Q', j=0 to M−1 are delivered at the input of the frequency/time transformation module 102.

The frequency/time transformation module of the decoder 100 carries out a transformation from the frequency representation space to the temporal representation space on the basis of the spectral coefficients X'(i,j), i=1 to Q', j=0 to M−1 received (in this case, this transformation is a reverse MDCT), and it thus determines a temporal frame for each of the Q' signals S'1, . . . S'Q'.

Each signal S'i, i=1 to Q' is intended for the speaker Hi of the sound reproduction system 103.

At least some of the operations carried out by the decoder are in an embodiment implemented following execution of computer program instructions on processing means of the decoder.

One advantage of encoding the components derived from the ambisonic transformation of the signals S1, . . . , SN, as described, is that, in the case where the number of signals N of the sound scene is large, it is possible to represent same by a number Q of ambisonic components much lower than N, while degrading the spatial quality of the signals very little. The volume of data to be transmitted is therefore reduced, and this is done without any significant degradation in the audio quality of the sound scene.

Another advantage of encoding according to the invention is that such encoding enables adaptability to the various types of sound reproduction systems, irrespective of the number, arrangement and type of speakers with which the sound reproduction system is equipped.

As a matter of fact, a decoder receiving a binary sequence comprising ambisonic components carries out on same a reverse ambisonic transformation of any order p' and corresponding to the number Q' of speakers of the sound reproduction system for which the signals are intended, once decoded.

Such encoding, as carried out by the encoder 1, makes it possible to order the elements to be encoded based on the respective contribution thereof to spatial accuracy and the respect of same for reproducing the directions contained in the sound scene, by means of the process Proc.

Thus, in order to adapt to the constraints of the rate imposed, it suffices to truncate the sequence by deleting the least relevant elements arranged in the bit stream. It is then guaranteed that the best spatial quality will be provided in light of the available rate. As a matter of fact, the elements were ordered such that the elements which contribute the least to spatial quality are placed at the end of the bit stream.

The invention claimed is:

1. A method for ordering spectral parameters relating to respective spectral bands of Q ambisonic components to be encoded originating from an audio scene comprising N signals, with N>1, said method comprising the following steps, performed for at least two different rates:

a) quantification of said Q ambisonic components with a rate among said at least two different rates to obtain quantified ambisonic components, calculation of the respective influence of at least some spectral parameters, taken from a set of spectral parameters to be ordered, on at least one generalized Gerzon angle vector defined as a function of energy and velocity vectors of acoustic pressures generated by a sound reproduction system according to Gerzon's criteria said generalized Gerzon angle vector being calculated as a function of a reverse ambisonic transformation applied to said quantified ambisonic components, comparison of respective generalized Gerzon angle vectors calculated with each of said at least two different rates; and b) allocation of an order of precedence to at least one spectral parameter as a function of the influence calculated for said spectral parameter compared to the other calculated influences.

2. The method of claim 1, wherein the calculation of the influence of a spectral parameter is carried out according to the following steps:

a) encoding a first set of spectral parameters of ambisonic components to be encoded according to a first rate;

b) determination of a first generalized Gerzon angle vector ($\xi_j(0)$) per spectral band;

c) determination of a second rate lower than said first one;

d) deletion of said current spectral parameter of the components to be encoded and encoding of the remaining spectral parameters of the components to be encoded according to the second rate;

e) determination of a second generalized Gerzon angle vector per spectral band;

f) calculation of a generalized Gerzon angle vector variation based on the determined deviations between the first and second generalized Gerzon angle vectors for the first and second rate per spectral band; and g) iteration of steps d) to f) for each of the spectral parameters of the set of spectral parameters of components to be encoded for ordering and determination of a minimum generalized Gerzon angle vector variation; the order of precedence assigned to the spectral parameter corresponding to the minimum variation being a minimum order of precedence.

3. The method of claim 2, wherein steps a) to g) are repeated with a limited set of spectral parameters of ambisonic components to be encoded for ordering, by deleting the spectral parameters for which an order of precedence was assigned.

4. The method of claim 2, wherein steps a) to g) are repeated with a set of spectral parameters of ambisonic components to be encoded for ordering in which the spectral parameters for which an order of precedence was assigned are allocated a lower quantification rate when using a nested quantifier.

5. The method of claim 1, wherein a first coordinate of the energy vector is based on the formula:

$$\frac{\sum_{1 \le i \le Q} Ti^2 \cos\xi_i}{\sum_{1 \le i \le Q} Ti^2},$$

a second coordinate of the energy vector is based on the formula:

$$\frac{\sum_{1 \le i \le Q} Ti^2 \sin\xi_i}{\sum_{1 \le i \le Q} Ti^2},$$

a first coordinate of the velocity vector is based on the formula:

$$\frac{\sum_{1 \le i \le Q} Ti \cos\xi_i}{\sum_{1 \le i \le Q} Ti}$$

and a second coordinate of the velocity vector is based on the formula:

$$\frac{\sum_{1\le i\le Q} Ti\sin\xi_i}{\sum_{1\le i\le Q} Ti},$$

wherein the $T_i$, i=1 to Q represent signals determined on the basis of reverse ambisonic transformation in relation to said quantified according to the rate in question, and the $\xi_i$ i=1 to Q are specific angles.

6. The method of claim 1, wherein:

a first coordinate of a generalized Gerzon angle vector ($\vec{\xi}_j(1)$) indicates an angle based on the sign of the second coordinate of the velocity vector and the arc cosine of the first coordinate of the velocity vector; and a second coordinate of a generalized Gerzon angle vector indicates an angle based on the sign of the second coordinate of the energy vector and the arc cosine of the first coordinate of the energy vector.

7. The method of claim 1, further comprising providing an ordering module configured to implement steps a) and b).

8. The method of claim 7, further comprising providing an audio encoder designed to encode a 3D audio scene comprising N respective signals in an outgoing bit stream, where N>1, the audio encoder comprising:

a transformation module designed to determine, on the basis of the N signals, spectral parameters relating to respective spectral bands of ambisonic components;

the ordering module designed to order at least some of the spectral parameters of the ambisonic components; and a binary sequence-forming module designed to form a binary sequence comprising data indicating spectral parameters relating to respective spectral bands of ambisonic components to be encoded, based on the ordering carried out by the ordering module.

9. The method of claim 1 further comprising providing a non-transitory computer readable medium comprising computer readable code for implementing steps a) and b).

10. The method of claim 1, further comprising providing a non-transitory binary sequence comprising data indicating spectral parameters relating to respective spectral bands of ambisonic components to be encoded, wherein said data is ordered according to an ordering method comprising steps a) and b).

* * * * *